Dec. 27, 1960    E. E. JUDGE, SR    2,966,245
CLUTCH AND BRAKE UNIT
Filed Nov. 13, 1956    2 Sheets-Sheet 1
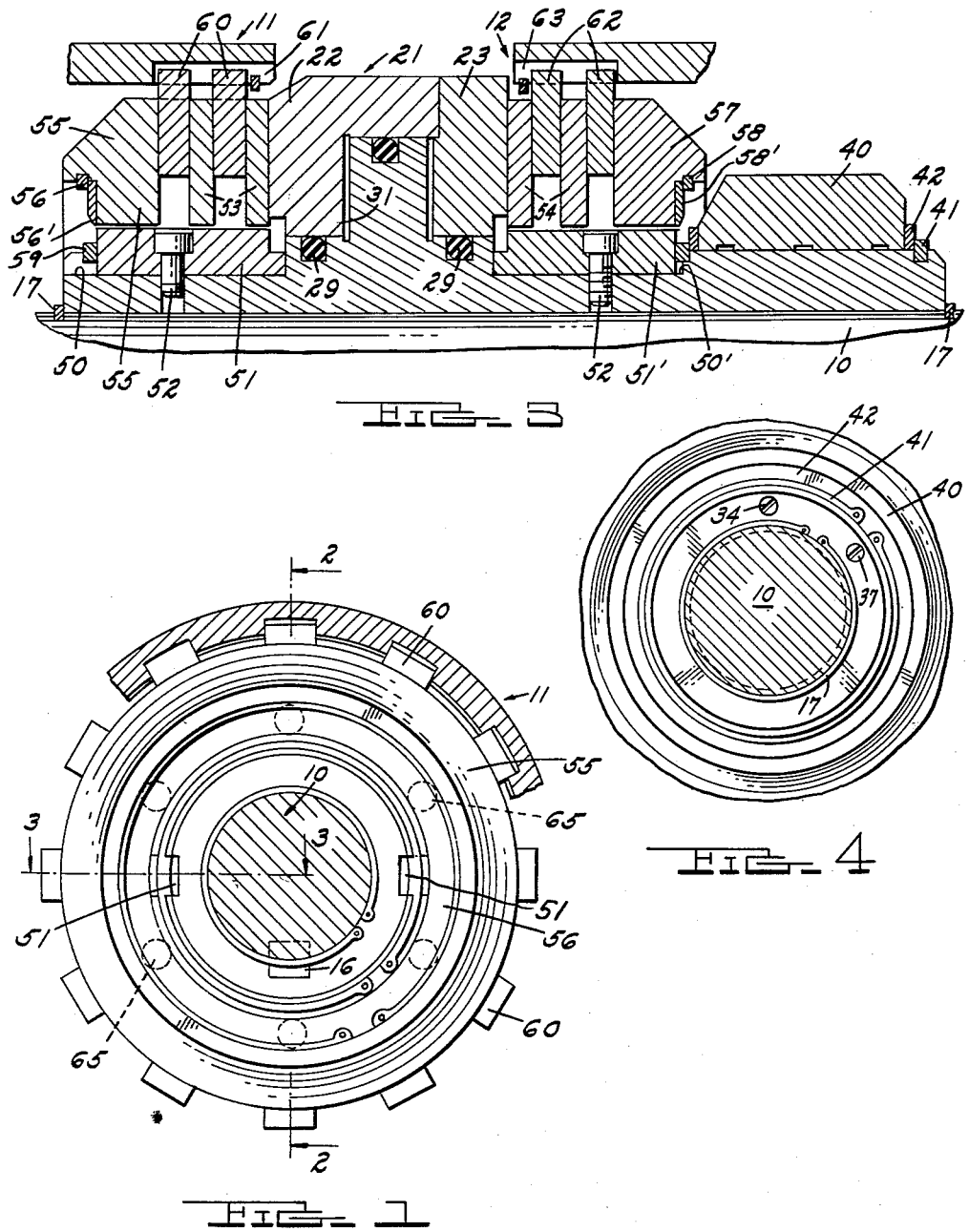
INVENTOR.
EDWARD E. JUDGE, SR.
BY
ATTORNEYS Dec. 27, 1960  E. E. JUDGE, SR  2,966,245
CLUTCH AND BRAKE UNIT
Filed Nov. 13, 1956  2 Sheets-Sheet 2
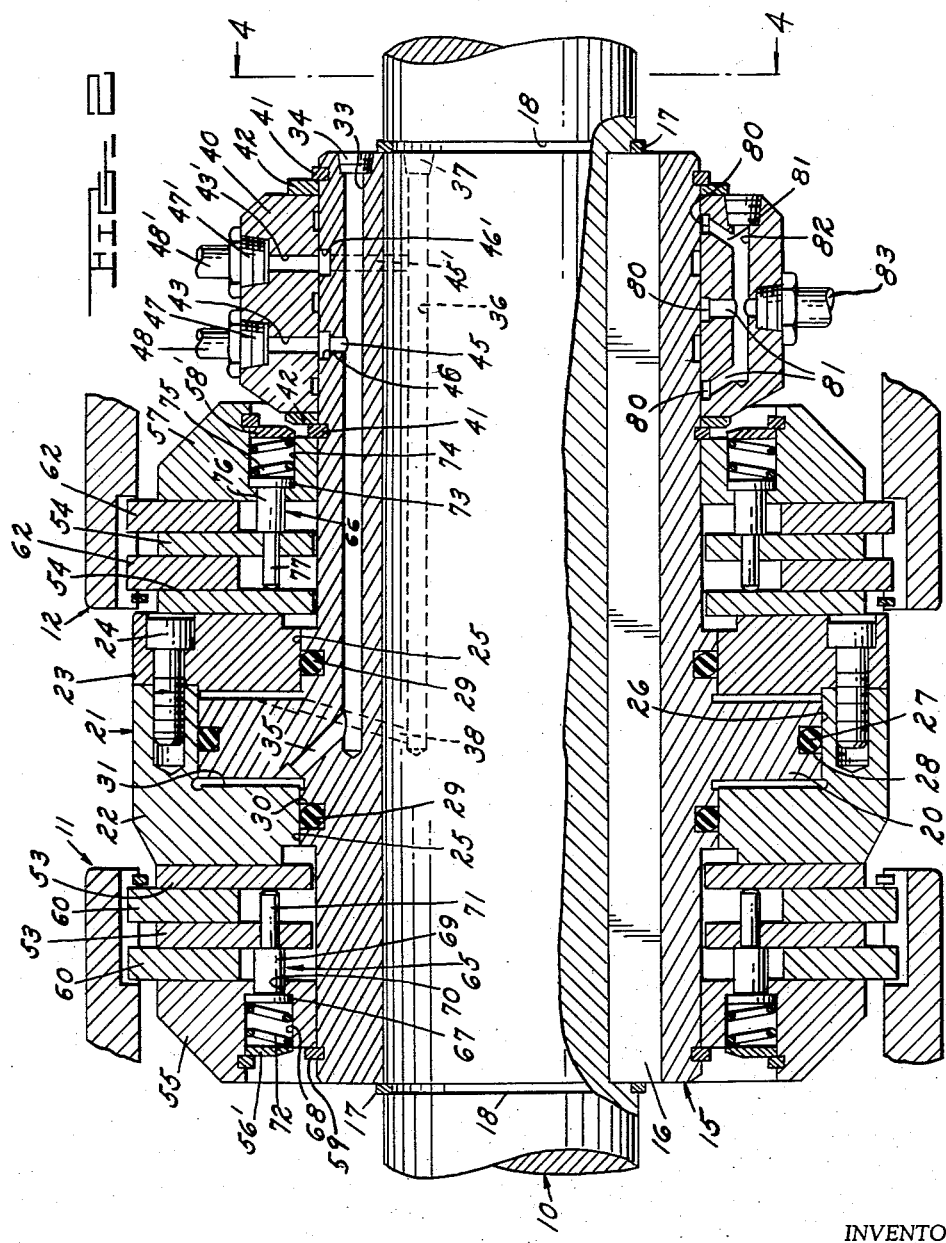
INVENTOR.
EDWARD E. JUDGE, SR.
BY
ATTORNEYS United States Patent Office 2,966,245
Patented Dec. 27, 1960

2,966,245

CLUTCH AND BRAKE UNIT

Edward E. Judge, Sr., Lansing, Mich., assignor to Industrial Metal Products Corp., Lansing, Mich., a corporation of Michigan Filed Nov. 13, 1956, Ser. No. 621,584

5 Claims. (Cl. 192—18)

The present invention relates to a combined clutch and brake unit and, more particularly, to a combination unit in which an output element can be coupled either to an input element or to a reaction element.

In power transmissions or power control mechanisms, it is often desirable to drive or brake, selectively, an output element. The present invention provides a unitary, inexpensive, and extremely simple device for so controlling an output element. The preferred embodiment of the present invention, as illustrated in the instant application, is preferably untilized as a machine tool drive, although it will be readily apparent that the device is adaptable to many other uses.

Generally, the device of this invention includes concentric input, output and reaction elements, each provided with friction drive members for selective connection to establish the various clutching and braking conditions.

By the use of concentric input and output elements, it is possible to utilize a single centrally located piston, which is actuatable axially in one direction to couple the output member element to the input element, which is actuatable in the opposite direction to couple the output element with the reaction element, and which is normally retained in a central or nonactuated neutral position. The central neutral position is attained by counterbalanced release means acting on opposite ends of the piston, while fluid pressure is utilized to actuate the piston in either direction from its neutral position.

In the illustrated embodiment, this fluid pressure actuated piston and its manifold connections to a source of fluid pressure are disposed exteriorly of the output element. Thus, the output element may take, preferably, the form of an axially extending shaft which need not be drilled or ported to provide fluid passageways. The simple and inexpensive shaft construction will be appreciated.

Further, the piston is preferably floatingly disposed on the shaft so as to be freely movable thereon, both rotationally and axially. The piston is sealed to the shaft, as by O rings, and the piston, although free on the shaft, will rotate with the shaft or be braked with the shaft so that there is no rotative stress or force on the shaft-to-piston seals. Thus, the seal life is improved and more effective sealing is obtained.

It is, therefore, an important object of this invention to provide an improved combination clutch and brake of extremely simple, inexpensive and efficient design.

Another object is the provision of a clutch and brake combination unit wherein a single, free-floating, fluid pressure actuated piston is utilized to actuate both the clutch and the brake.

It is a further object to provide a combination clutch and brake unit in which an output member is adapted to be coupled to either a rotatable input member or a stationary reaction member by means of a single double-acting piston, positive means being provided to release that element to which the output member is not coupled.

Yet another important object is the provision of an improved clutch and brake mechanism wherein an exterior floating piston is utilized to connect an output element to either an input element or a fixed reaction element, the piston being free for either rotaton or braking with the output element, so as to prevent relative movement between the piston and the output member.

It is a still further object of the present invention to provide an improved clutch and brake mechanism wherein an axial shaft supports thereon a relatively freely movable piston, the seal means interposed between the shaft and the piston being subjected only to relative axial movement between the piston and the shaft.

On the drawings:

Figure 1 is a fragmentary radial sectional view of the combined clutch and brake of the present invention;

Figure 2 is an enlarged sectional view taken along the plane 2—2 of Figure 1;

Figure 3 is a sectional view similar to Figure 2 but taken along the plane 3—3 of Figure 1; and Figure 4 is a fragmentary sectional view taken along the plane 4—4 of Figure 2.

In Figures 1 and 2, reference numeral 10 refers generally to an axially-extending shaft which forms the output member of the preferred embodiment of the combined clutch and brake of the present invention. Substantially concentric with the output element or shaft 10 is the annular end 11 of a rotatable input element. Also substantially concentric with the shaft 10 is the annular end 12 of a rotationally fixed reaction member.

Mounted upon the shaft 10 in surrounding relation thereto is a generally cylindrical manifold, indicated generally at 15, the manifold 15 and the shaft 10 being secured together for corotation by an axially extending key 16. Relative axial movement between the manifold 15 and the shaft 10 is prevented by a pair of snap rings 17 inserted in annular grooves 18 formed in the shaft 10, the snap rings projecting radially from the grooves 18 to overlie the axial ends of the manifold 15. The manifold 15 is, in effect, integral with the shaft 10, although exterior thereto.

Medially of the manifold 15 is an integral radially extending flange 20 which is interposed between a double-acting piston assembly indicated generally at 21 and comprising elements 22 and 23 secured together by suitable means, as by bolts 24 to form the assembly 21. On either side of the flange 20, the manifold 15 is provided with a pair of annular sealing surfaces 25 which are concentric with the periphery 26 of the flange 20. The piston assembly 21 is sealed to the manifold 15 by annular O rings, including an O ring 27 positioned in an annular grove 28 formed in the peripheral flange face 26, and O rings 29 positioned in grooves 30 formed in the sealing faces 25 of the manifold 15.

The piston assembly 21 is provided with a central annular chamber 31 receiving the flange 20 and of an axial dimension substantially greater than the corresponding dimension of the flange 20. Thus, the piston 21 is free for axial movement relative to the output element 10 and the flange 20 thereof. The piston assembly 21 is also free for relative rotation with respect to the output element 10, although there will be some frictional drag between the piston assembly 21 and the manifold 15.

The manifold 15 is provided with a first axially extending fluid pressure passage 33 which is plugged at one end, as by a plug 34, and which is in communication at its other end with a generally radially extending outlet passage 35. This outlet passage 35 communicates with the chamber 31 on the left side of the flange 20, as illustrated in Figure 2. The manifold is provided with a second fluid passage 36, also plugged at one end as at 37, which leads through an outlet passage 38 to the chamber 31 on the right side of the flange 20. The "O" ring 27 thus divides the chamber 31 into two fluid chambers on opposite sides of the flange 20.

Disposed adjacent one end of the manifold 15 and in surrounding relation with respect thereto is an annular collar 40. This collar 40 is fixed against relative axial movement with respect to the manifold 15 by a pair of snap rings 41 and bearing washers 42. The collar 40 is provided with a pair of radial fluid pressure passages 43 and 43' which communicate respectively with radial passages 45 and 45' connecting the passage 43 with passage 33 and the passage 43' with passage 36, respectively. To accommodate rotation of the manifold 15 within the stationary collar 40, the manifold is provided with annular communication recesses 46 and 46'. The collar 40 threadedly receives fittings 47 and 47' connecting the passages 43 and 43', respectively, to suitable fluid pressure conduits 48 and 48' which are in communication with a suitable source of pressure (not shown).

As best shown in Figure 3 of the drawings, the manifold 15 is provided with axially-extending radial recesses 50 and 50' located either side of the peripheral flange 20 and adapted to receive therein axially-extending keys 51 and 51', respectively, the keys being retained in the recesses by suitable means, as by screws 52. Diametrically spaced keys 51 connect the shaft 10, through the manifold 15, to a pair of annular, radially-extending friction clutch discs 53 adjacent one end of the manifold 15 and in radial alignment with the end 11 of the input member. Diametrically spaced keys 51' connect the shaft, through the manifold 15, with annular radially-extending friction brake plates 54.

A clutch backing plate 55 is secured to the manifold 15 through keys 51, and a snap ring 59 while a brake backing plate 57 similarly is secured to the shaft 10 through the keys 51', and snap ring 58. Interposed between the clutch plates 53 and between one of the clutch plates 53 and the clutch backing plate 55 are a pair of annular input friction clutch plates 60 which are splined, as at 61, to the end 11 of the input member. Interposed between the two brake friction plates 54 and between one of the brake friction plates 54 and the brake backing plate 57 are a pair of annular friction brake plates 62 which are splined, as at 63, to the end 12 of the reaction element.

It will be seen that the double acting piston 21 is interposed between the clutch elements 53, 55 and 60 and the brake elements 54, 57 and 62. The piston is centered between the clutch and brake elements by means of a plurality of release pins 65 for the clutch elements and a plurality of release pins 66 for the brake elements.

The release pins 65 for the clutch elements are provided with terminal enlarged peripheral shoulders 67 and are disposed in a series of peripherally arranged apertures 68 in the clutch backing plate 55. The reduced medial portions 69 of the pin 65 project forwardly through a reduced aperture 70 to bear against one of the shaft-mounted clutch plates 53, and a terminal extension 71 of the pins bears at its ends against the other of the shaft-mounted plates 53. Disposed within the apertures 68 are release springs 72 interposed between the annular ring 56', held by snap ring 56 (Figure 3), and the enlarged heads 67 of the pins. These springs 72 urge the pins 65 to the right (as shown in Figure 2) to disengage the plates 53 from the plates 60.

The brake release pins 66 are similar in construction to the clutch release pins 65, the pins 66 having enlarged heads 73 disposed in peripherally arranged apertures 74 in the brake release plate 57 and urged to the left (as shown in Figure 2) by compression springs 75 interposed between the heads 73 and the annular ring 58' held by snap ring 58. The medial portions 76 of the pins bear against one of the brake plates 54 and the terminal projections 77 of the pins bear against the other of the brake plates 54.

The pins 65 and 66 thus are counterbalanced to act in opposite directions upon the piston 21. The pins are limited in their movement toward the piston 21 by the stepped pin configurations, so that the piston is centrally located in a neutral position at which neither the clutch members 53, 60 nor the brake members 54, 62 are engaged.

Upon the introduction of fluid under pressure from a source and through the line 48 and the passages 43, 46, 45, 33 and 35, fluid under pressure is effective to urge the piston 21 to the left. This fluid pressure is isolated in the chamber 31 on the left side of the flange 20 by the seal ring 29 and by the seal ring 27. This fluid pressure is sufficient to move the pins 65 to the left against the force of the compression springs 72, and the friction clutch plates 53 and 60 are urged toward the axially fixed backing plate 55. The shaft 10 and the input member 11 are thereby coupled together for corotation. To release the clutch elements 53, 60, it is only necessary to vent the conduit 48 to atmospheric pressure or some pressure less than that generated by the cumulative compression forces of the springs 72, so that the pins 65 can overcome the fluid pressure in the chamber 31 to move the shaft-mounted clutch plates 53 to the right to again assume the neutral position of the piston 21.

To apply the brake and to retain the shaft 10 against rotative movement, it is only necessary to introduce fluid under pressure through the conduit 48' and the passages 43', 46', 45', 36 and 38 to the chamber 31 on the right-hand side of the flange 20. This fluid pressure will urge the piston 21 to the right (as shown in Figure 2) against the cumulative forces of the release pins 66 so that frictional contact is established between the shaft-mounted brake plates 54 and the brake plates 62 splined to the reaction element 12. Upon venting the conduit 48' to a lesser pressure or to atmosphere, the return springs 75, through the pins 66, will return the piston 21 to a neutral position and release the brake. It will be understood that the release pins are adapted to establish a positive spacing between the backup and slidable clutch or brake plates drivingly keyed to the manifold and output shaft, which spacing exceeds the thickness of the friction plates drivingly splined to the respective input and brake reaction members by an amount sufficient to assure substantially complete freedom from frictional drag. A release clearance between the respective friction plate members in the order of .004 inch has proved adequate for this purpose.

It will be noted that the piston 21 is not drivingly connected to the shaft 10 or to the manifold 15. Rather, the piston is freely floating for relative rotational or axial movement. The limited relative axial movement necessary to establish driving relation between the shaft 10 and the input member 11, or to establish braking relation between the shaft 10 and the reaction member 12 may be readily accommodated by the seal rings 27 and 29. Since these seal rings 27 and 29 are normally compressed between the piston assembly 21 and the surfaces 25 and 26 of the manifold 15, there will be some frictional drag between the piston assembly and the manifold. This frictional drag will be sufficient to insure corotation of the piston and the manifold which, as heretofore explained, functions as an integral part of the shaft 10 because of its keyed connection thereto. Thus, the piston is either rotatable with the shaft, as when the shaft is clutched to the input element 11, or stationary with the shaft 10, as when the shaft is braked to the reaction element 12. Consequently, no relative rotational stresses or frictional contact forces are generated or effective upon the seal rings 27 and 29 during operation of the device.

As illustrated in Figure 2, there is no extraneous sealing means interposed between the fixed annular manifold ring 40 and the rotatable manifold 15. The close running, but relatively rotatable, fit between these manifold elements is sufficient to insure against any substantial leakage. However, to accommodate the small amount of leakage which will inevitably occur, the inner annular surface of the manifold ring 40 is provided with a series of axially-spaced grooves 80 which are connected by branch passages 81 to an axially-extending passage 82 connectible to a conduit 83 leading to the fluid pressure sump. Thus, any leakage at the manifold elements 15 and 40 is drained at atmospheric pressure.

While a preferred embodiment of my invention has been described above in detail, it will be understood that numerous modifications may be resorted to without departing from the scope of the following claims.

I claim:

1. A combined brake and clutch, comprising an input element, reaction element, and an axially extending annular output element, a set of engageable friction members connected respectively to said input and output elements, a set of engageable friction members connected respectively to said reaction and output elements, a free-floating external piston on and rotatable with said output element interposed between said sets of friction members for axial movement in either direction, and fluid pressure means for actuating said piston including a manifold sleeve having a radially extending flange within said piston peripherally surrounding the output element, and seal means interposed between the manifold and the piston to define separate fluid pressure chambers on either side of said flange for selectively actuating the respective sets of friction members.

2. The brake and clutch of claim 1, wherein said sleeve is fixed to the output element for rotation therewith, and said piston is free of any positive rotational driving connection with said manifold sleeve.

3. The brake and clutch of claim 1, wherein said piston is free of any positive rotational driving connection with any element.

4. A clutch construction for drivingly connecting rotatable axially fixed aligned input and output elements characterized by axially displaceable inter-engageable frictional driving means connected respectively to said axially fixed input and output elements, an axially fixed sleeve extending around and drivingly connected to one of said elements having a radial outwardly extending flange, an axially displaceable external piston extending around said sleeve and over said flange defining a fluid pressure chamber therebetween, an external surface on said piston adapted upon axial displacement to engage said frictional driving means, an axially fixed backup member for said frictional driving means reactively connected to said sleeve, a stationary fluid collector ring mounted on an outer perimeter of said sleeve having an inlet port adapted for connection to a source of fluid pressure, and fluid passage means in said sleeve communicating with said port and said chamber for conducting actuating pressure to said piston for engaging said clutch.

5. A clutch construction as set forth in claim 4 wherein said piston is free of any positive rotational driving connection with any element.

References Cited in the file of this patent

UNITED STATES PATENTS

| | | |
|---|---|---|
| 847,834 | Sears et al. | Mar. 19, 1907 |
| 1,085,146 | McClellan | Jan. 27, 1914 |
| 1,254,951 | Ward | Jan. 29, 1918 |
| 2,159,326 | Harwood et al. | May 23, 1939 |
| 2,193,068 | Keck | Mar. 12, 1940 |
| 2,345,410 | Mierley | Mar. 28, 1944 |
| 2,587,230 | Schaad | Feb. 26, 1952 |
| 2,773,577 | Kapenkin | Dec. 11, 1956 |
| 2,836,270 | Leopold | May 27, 1958 |